(12) United States Patent
Pfeifer et al.

(10) Patent No.: US 12,744,947 B2
(45) Date of Patent: Sep. 22, 2026

(54) SYSTEMS, METHODS, AND APPARATUSES FOR IMPROVED CONTENT RECORDING AND PLAYBACK

(71) Applicant: Comcast Cable Communications, LLC, Philadelphia, PA (US)

(72) Inventors: Jeremy Phillip Pfeifer, Highlands Ranch, CO (US); Spencer Darl Schumann, Castle Rock, CO (US); Viktor Burka, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/748,631

(22) Filed: May 19, 2022

(65) Prior Publication Data

US 2022/0408125 A1 Dec. 22, 2022

Related U.S. Application Data

(60) Provisional application No. 63/213,518, filed on Jun. 22, 2021.

(51) Int. Cl.

| | |
|---|---|
| ***H04N 21/231*** | (2011.01) |
| ***H04N 21/235*** | (2011.01) |
| ***H04N 21/239*** | (2011.01) |
| ***H04N 21/433*** | (2011.01) |

(52) U.S. Cl.

CPC ..... *H04N 21/23106* (2013.01); *H04N 21/235* (2013.01); *H04N 21/2393* (2013.01); *H04N 21/4334* (2013.01)

(58) Field of Classification Search

CPC ......... H04N 21/4334; H04N 21/23106; H04N 21/2393

See application file for complete search history.

(56) References Cited

U.S. PATENT DOCUMENTS

| | | | | |
|---|---|---|---|---|
| 10,796,345 | B1 * | 10/2020 | Qureshi | H04L 65/762 |
| 2003/0226150 | A1 * | 12/2003 | Berberet | H04N 7/17318 725/86 |
| 2014/0359081 | A1 * | 12/2014 | Van Deventer | H04L 67/63 709/219 |
| 2018/0014041 | A1 * | 1/2018 | Chen | H04L 65/612 |
| 2019/0313157 | A1 * | 10/2019 | Fitzgerald | H04N 21/2747 |
| 2020/0053398 | A1 * | 2/2020 | Syed | H04N 21/2353 |
| 2021/0368221 | A1 * | 11/2021 | Loheide | H04N 21/812 |
| 2022/0174370 | A1 * | 6/2022 | Jackson | H04N 21/4363 |

* cited by examiner

*Primary Examiner* — Joshua D Taylor

(74) *Attorney, Agent, or Firm* — Ballard Spahr LLP

(57) ABSTRACT

Methods, systems, and apparatuses for improved content recording and playback are described herein. A user device may concurrently record and output a content item. For example, the user device may be associated with a recording session. A session index may identify the recording session and indicate the user device is concurrently recording and outputting the content item. The session index may be used to ensure that a manifest for the content item is continuously updated.

20 Claims, 8 Drawing Sheets

200
102
SOURCE STREAM(S)
202
RECORDING AGENT
105
204
132
DATABASE
137
206
SESSION MODULE
113
212
208
INTELLIGENT CACHE
115
210
MANIFEST GENERATOR
140

201
132
DATABASE
137
COMPUTING DEVICE
110E
SESSION MODULE
113
203
207
211
COMPUTING DEVICE
110C
205
INTELLIGENT CACHE
115
209
MANIFEST GENERATOR
140

300

| User (302) | Recording ID (304) | Last Request (306) |
|---|---|---|
| Bob | abc123 | 2020-12-18T05:02:31.35Z |
| Alice | wxy456 | 2020-12-18T05:02:28.01Z |
| Dan | hij345 | 2020-12-18T05:02:33.57Z |

SYSTEMS, METHODS, AND APPARATUSES FOR IMPROVED CONTENT RECORDING AND PLAYBACK

CROSS-REFERENCE TO RELATED PATENT APPLICATION

This application claims priority to U.S. Provisional Application No. 63/213,518, filed on Jun. 22, 2021, the entirety of which is incorporated by reference herein.

BACKGROUND

Uninterrupted delivery of content to media devices is crucial for an overall positive user experience. For systems that implement cloud-based digital video recording, manifests for live content continue to grow while the live content is airing (e.g., as new content is encoded). Generating these manifests on a per-user basis may require an extensive amount of computational resources. When computational resources are stretched too thin, cascading effects within these systems may negatively impact the user experience. These and other considerations are discussed herein.

SUMMARY

It is to be understood that both the following general description and the following detailed description are exemplary and explanatory only and are not restrictive. Methods, systems, and apparatuses for improved content recording and playback are described herein. A user device may concurrently record and output a content item during a recording session. A session module may maintain a session index that identifies the recording session and indicates the user device is concurrently recording and outputting the content item. The user device may send a request for a next portion of the content item (e.g., a new portion). The request may be indicative of a portion of a manifest for the content item associated with the next portion of the content item. The session index may be used to ensure that the portion of the manifest for the content item associated with the next portion is generated and stored prior to the user device sending the request.

A caching device may receive the request. Upon retrieving the portion of the manifest associated with the next portion of the content item (e.g., from cache/storage), the caching device may send that portion of the manifest to the user device. The user device may receive the portion of the manifest associated with the next portion of the content item. The user device may output the next portion of the content item during the recording session using the portion of the manifest.

Other examples are possible as well. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 3 shows an example data table;

DETAILED DESCRIPTION

Figure 1:
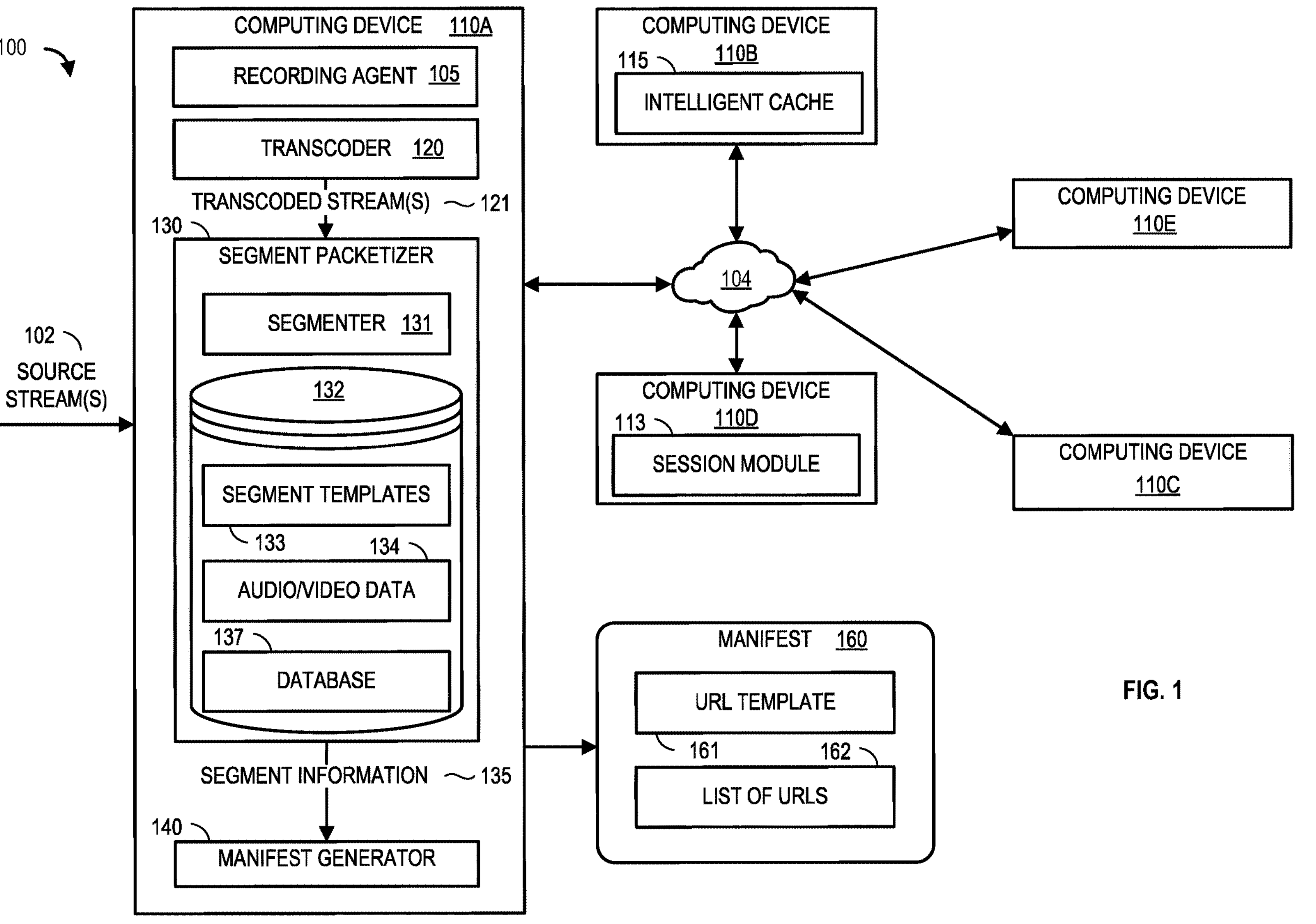
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved content recording and playback are described herein. Content streaming services, such as cloud-based digital video recording (DVR) services, may rely on manifest files/messages (collectively referred to herein as "manifests" or "content manifests") when providing content to user devices. Such manifests may comprise a description of audio and/or video files for a particular content item or portion thereof. For a linear/live content item, the corresponding manifest may include a rolling window identifying the most recent portion(s) of content, and it may, therefore, be close to a fixed size. User devices streaming/outputting a linear/live content item may periodically send requests for updates to the corresponding manifest in order to receive the most recently encoded/available portion(s) of the content item. For a content item that is streamed/output "on-demand," the corresponding manifest may be static in terms of size, because it typically identifies all corresponding portions of the content item. For recorded content items, such as cloud-based DVR recordings, the corresponding manifests, in terms of size and composition, may have aspects of a manifest for a linear/live content item as well as a manifest for an on-demand content item. The manifests for recorded content items may be considered dynamic, since they continue to "grow" as the recordings takes place. Generating manifests on a per-user basis for the same content item that is recorded by multiple users may require an extensive amount of computational resources.

When computational resources are stretched too thin at content delivery networks, cascading effects may negatively impact user experience (e.g., downgrading a requested bitrate, network lag, etc.). Computational resources may be saved by generating/updating manifests (or portions thereof) for recorded content items as new portions are received and processed. For example, a content delivery network may include a recording agent (e.g., a module, a device, a subroutine(s), etc.). The recording agent may receive new portions of a content item as they are encoded/processed. The recording agent may store the new portions of the content item as well as associated metadata that identifies the new portions of the content item. The recording agent may send a message to a session module when such new portions of the content item are received and stored. The session module may track user devices that are recording the content item using a session index. The session index may identify which of the user devices are concurrently recording and outputting the content items (e.g., hot-recording the content item). The session index may, or may not, identify user devices that are recording but not simultaneously outputting the corresponding content items (e.g., cold-recording the content items).

The session module may send a message to a caching device (e.g., a storage device and/or a system of storage devices) when new portions of the content item are received and stored by the recording agent. The caching device, in response to receiving the message from the session module, may fetch (e.g., retrieve, request, etc.) an updated manifest (or portion thereof) for the content item. For example, the caching device may request the updated manifest from a manifest generator. The caching device may request the updated manifest even if a cached version of the manifest is stored at the caching device (e.g., a forced refresh of the manifest may be performed). For example, the caching device may request the updated manifest even if a cached version of the manifest is stored at the caching device in order to ensure that a most up-to-date version of the manifest (or a portion(s) thereof corresponding to a new portion(s) of the content item) is cached at the caching device before it is requested by a user device. This "manifest refresh" of the caching device, which ultimately is performed in response to receiving the message from the session module, may prevent a cache miss(es) from occurring. For example, a cache miss may occur when a user device requests a manifest (or a portion thereof) that is not already cached at the caching device (e.g., requiring the caching device to retrieve the requested manifest, or portion, from another device/location). Performing the manifest refresh and subsequently caching the updated manifest may result in a "cache hit(s)" when a user device(s) requests the updated manifest, because the manifest refresh ensures that the updated manifest is already cached at the caching device before the user device(s) requests the updated manifest/corresponding portion(s) of the content item.

The manifest generator may receive a message from the caching device as part of the "forced refresh" described herein. The manifest generator may generate and/or update the manifest. For example, the manifest generator may use the metadata associated with the new portions of the content item that the recording agent previously stored to determine an update to the manifest. The update to the manifest may comprise determining (e.g., generating, appending, modifying, etc.) a portion of the manifest associated with the new portions of the content item to an existing manifest associated with the content item. The manifest generator may perform an update to each manifest for the content item associated with each user device that is concurrently recording and outputting the content item.

A user device may be associated with a recording session of the content item. For example, the user device may be concurrently recording and outputting the content item. The user device may send a request for a next portion of the content item (e.g., a next segment of the content item). The user device may send the request to a packaging device. The request may be indicative of a portion of the manifest for the content item associated with the next portion of the content item. The packaging device may forward the request to the caching device, which may in turn send a message indicative of the request to the session module. The session module may update (e.g., generate, append, modify, etc.) the session index to indicate the user device is concurrently recording and outputting the content item (e.g., if the session index does not already indicate as much).

The caching device may determine whether the portion of the manifest associated with the next portion of the content item is already stored/cached. In scenarios in which the caching device determines that the portion of the manifest associated with the next portion of the content item is not already stored/cached, the caching device may request that portion of the manifest from the manifest generator. Upon retrieving the portion of the manifest associated with the next portion of the content item (e.g., from cache or from the manifest generator), the caching device may send that portion of the manifest to the packaging device. The packaging device may send the portion of the manifest associated with the next portion of the content item to the user device, which may in turn request and subsequently output the next portion of the content item during the corresponding recording session.

FIG. 1 shows an example system 100 for improved content recording and playback. The system 100 may comprise a content delivery network, a data network, a content distribution network, or any other network or content distribution system that one skilled in the art would appreciate. The system 100 may comprise computing devices 110A-110E. FIG. 1 shows the computing device 110A as comprising a plurality of modules and components and the computing devices 110B and 110D as only comprising one module/component each for explanatory purposes only. It is to be understood that all of the computing devices 110A-110E shown in the system 100 may comprise additional components/modules, other than those that are shown in FIG. 1. For example, as shown in FIG. 1, the computing device 110A may comprise a recording agent 105. In other example configurations of the system 100, the recording agent 105 may be a component/module of another computing device—or an entirely separate entity (not shown). As another example, as shown in FIG. 1, the computing device 110B may comprise an intelligent cache 115. In other example configurations of the system 100, the intelligent cache 115 may be a component/module of another computing device—or an entirely separate entity (not shown). Other example configurations are possible.

The computing devices 110A-110E may communicate via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.).

The computing device 110A may comprise an origin. An origin computing device may comprise a server (e.g., a content server) and/or a device (e.g., an encoder, decoder, transcoder, packager, etc.). An origin computing device may generate and/or output portions of content for consumption (e.g., output). For example, an origin computing device may convert raw versions of content (e.g., broadcast content) into compressed or otherwise more "consumable" versions suitable for playback/output by user devices, media devices, and other consumer-level computing devices. "Consumable" versions of content—or portions thereof—generated and/or output by an origin computing device may include, for example, data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4 k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or any other video file format, whether such format is presently known or developed in the future. For ease of explanation, the description herein may use the phrase "origin computing device" in the singular form. However, it is to be understood that an origin computing device may comprise a plurality of servers and/or a plurality devices that operate as a system to generate and/or output portions of content, convert raw versions of content (e.g., broadcast content) into compressed or otherwise more "consumable" versions, etc.

The computing device 110A may comprise a recording agent 105, a transcoder 120, a segment packetizer 130, and/or a manifest generator 140, each of which may correspond to hardware, software (e.g., instructions executable by one or more processors of the computing device 110A), or a combination thereof. The transcoder 120 may perform bitrate conversion, coder/decoder (CODEC) conversion, frame size conversion, etc. For example, the computing device 110A may receive a source stream 102 and the transcoder 120 may transcode the source stream 102 to generate one or more transcoded streams 121. The source stream 102 may be a live stream (e.g., a linear content stream) or a video-on-demand (VOD) stream. The computing device 110A may receive the source stream 102 from an external source (e.g., a stream capture source, a data storage device, a media server, etc.). The computing device 110A may receive the source stream 102 via a wired or wireless network connection, such as the network 104 or another network (not shown). It should be noted that although a single source stream 102 is shown in FIG. 1, this is not to be considered limiting. The computing device 110A may receive any number of source streams 102.

As discussed herein, the computing device 110A may receive a source stream 102 and the transcoder 120 may transcode the source stream 102 to generate one or more transcoded streams 121. The recording agent 105 may instruct the transcoder 120 to generate the one or more transcoded streams 121 for one or more recording sessions/content recordings. The recording agent 105 may cause the transcoded streams 121, as well as associated metadata that identifies each portion of the corresponding content items, to be stored by the segment packetizer 130. For example, the segment packetizer 130 may comprise a storage medium 132, as shown in FIG. 1. The storage medium 132 may be in communication with at least one other storage medium (not shown). While FIG. 1 shows the storage medium 132 as being a part of the computing device 110A, it is to be understood that the storage medium 132 may be a separate entity or entities. The storage medium 132 may store the transcoded streams 121 of the content items (e.g., recorded content). As discussed further herein, the segmenter 131 may generate segment templates 133 for each segment (e.g., portion) of each of the transcoded streams 121. Each of the segment templates 133 may include metadata indicative of the underlying audio/video data 134 for the corresponding segment. The metadata that identifies each portion of the corresponding content items may comprise—or be based on—the segment templates 133 and/or the underlying audio/video data 134 for each corresponding segment/portion of a content item. The storage medium 132 may comprise a database 137. The recording agent 105 may cause the metadata that identifies each portion of the corresponding content items to be stored in the database 137.

The system 100 may comprise a computing device 110B. The computing device 110B may be in communication with each device shown in the system 100. The computing device 110B may comprise an intelligent cache 115. The intelligent cache 115 may comprise one or more caching devices (e.g., storage mediums). The intelligent cache 115 may store manifests (e.g., manifest files) associated with each of the content items (or portions thereof), as further discussed herein.

The system 100 may comprise a computing device 110D. The computing device 110D may be in communication with each device shown in the system 100. The computing device 110D may comprise a session module 113. The session module 113 may track computing devices that are recording content items using a session index, as further discussed herein. The session index may identify which computing devices are concurrently recording and outputting the corresponding content items (e.g., hot-recording the content items). The session index may, or may not, identify computing devices that are recording but not simultaneously outputting the corresponding content items (e.g., cold-recording the content items).

The system 100 may comprise a computing device 110E. The computing device 110D may be in communication with each device shown in the system 100. The computing device 110E may comprise a content/media player, a set-top box, a client device, a smart device, a mobile device, a user device, etc. As further described herein, the computing device 110E may record one or more content items and/or output the one or more content items. The computing device 110E may interact with the computing device 110C (e.g., a just-in-time packager) when requesting and/or receiving portions of content items.

Each of the transcoded streams 121 may correspond to a plurality of adaptive bitrate (ABR) representations of the source stream 102. For example, the transcoded streams 121 may differ from each other with respect to audio bitrate, a number of audio channels, an audio CODEC, a video bitrate, a video frame size, a video CODEC, a combination thereof, and/or the like. The one or more transcoded streams 121 may be sent to the computing device 110C (e.g., a just-in-time packager), as further described herein. For example, the source stream 102 (e.g., a mezzanine feed) may be used to generate one or more representations of a content item that have varying bitrates and/or alternative CODECs on-the-fly. As an example, a CODEC switch from an H.264/advanced audio coding (AAC) input stream to a VP8 representation and a Vorbis representation may be performed. Audio formats may be switched from a first format to another (e.g., from a surround sound format to a stereo format). The transcoder 120 may transcode the source stream 102 such that key frames (e.g., intra-coded frames (I-frames)) in each of the transcoded streams 121 occur at the same time as in the source stream 102. That is, each of the transcoded streams 121 may be "key frame aligned" to enable seamless switching between different ABR representations by a destination device (e.g., the computing device 110E).

The segment packetizer 130 may comprise a segmenter 131. The segmenter 131 may divide a set of ABR representations (e.g., the transcoded streams 121) into media segments. For example, the segmenter 131 may receive a target segment duration. The target duration may be, for example, approximately ten thousand milliseconds. The target segment duration may be received via user input, determined via a configuration file at the computing device 110A, determined based on properties of the source stream 102, received via the computing device 110A, a combination thereof, and/or the like. For example, if the target segment duration is ten seconds, the segmenter 131 may process the incoming transcoded streams 121 and break the transcoded streams 121 into segments at key frame boundaries approximately ten seconds apart. If the transcoded streams 121 include separate video and audio streams, the segmenter 131 may generate the segments such that the video and audio streams are timecode aligned.

The computing device 110A may support multiple content segmentation types. The segmenter 131 may generate segments for each of the content segmentation types supported by the computing device 110A. Segments may alternately be referred to as "chunks." The computing device 110A may support both multiplexed segments (video and audio data included in a single multiplexed stream) and non-multiplexed segments (video and audio data included in separate non-multiplexed streams). Further, in the case of MPEG-DASH and/or HLS, the computing device 110A may support container formats in compliance with international standards organization base media file format (e.g., ISOBMFF, associated with a file extension ".m4s"), motion picture experts group 2 transport stream (e.g., MPEG-TS), extensible binary markup language (e.g., EBML), WebM, Matroska, or any combination thereof.

The segmenter 131 may employ a "smart" storage system of audio/video data. In one example, if the computing device 110A supports N content segmentation types (where N is an integer greater than zero), the segmenter 131 may generate N segment templates 133 for each segment (e.g., ten second portion) of each of the transcoded streams 121. Each segment template 133 may comprise header information associated with a content segmentation type, data indicating a start position or start time of the segment in the source stream 102, and data indicating an end position or end time of the segment in the source stream 102. In the example of MPEG-DASH and/or HLS content, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. As the segment templates 133 are generated, the segmenter 131 may generate and/or send segment information 135 regarding the segment templates 133 and the underlying segment audio/video data 134 corresponding to the particular segment. The segmenter 131 may send the segment information 135 to a manifest generator 140.

The manifest generator 140 may generate one or more manifests (e.g., manifest files) based on the segment information 135 received from the segment packetizer 130. In the case of MPEG-DASH and/or HLS, the manifest may be a MPEG-DASH media presentation description (MPD) file. The manifest generator 140 may generate one or more manifests based on a manifest type and/or a content segmentation type. For example, the manifest generator 140 may generate, based on the segment information 135, a manifest 160. The manifest 160 may comprise a URL template 161. The URL template 161 may be number-based or time-based. A URL template 161 that is number-based may be used by the computing device 110E to construct URLs to request individual segments (e.g., portions) according to corresponding segment number. A URL template 161 that is time-based may be used by the computing device 110E to construct URLs to request individual segments according to corresponding segment start time. If the manifest type is list-based, the manifest generator 140 may generate, based on the segment information 135, a manifest 160 that comprises a list of URLs 162. The list of URLs may include URLs that are specific to one or more segments of one or more ABR representations.

The manifest 160 may identify one or more segments of one or more adaptive streaming representations of the source stream 102. For example, the transcoded streams 121 generated by the transcoder 120 may include three ABR representations of the source stream 102: a first representation with a bit rate of 2 megabits per second (Mbps) and a frame size of 720p, a second representation with a bit rate of 750 kilobits per second (Kbps) and a frame size of 160p, and a third representation with a bit rate of 250 kbps and a frame size of 120p. More, fewer, and/or different adaptive streaming representations may be generated by the transcoder 120, where each generated adaptive streaming representation(s) may have a plurality of key frame aligned segments. The manifest generator 140 may generate manifests based on the segment information 135 from the segment packetizer 130, including information associated with the segment(s) of the adaptive streaming representation(s) generated by the transcoder 120.

While FIG. 1 only shows one computing device 110E (e.g., one client/playback device), it is to be understood that the system 100 may comprise any number of computing devices that record and/or output content items (or portions thereof). A different manifest 160 may be generated for each computing device (e.g., each client/playback device) that requests a manifest for a particular content item (or portion thereof), even if two or more computing devices specify the same manifest type and content segmentation type. For example, the manifest 160 may be specific to the computing device 110E. Each URL or URL template in the manifest 160 may include embedded session information that identifies the computing device 110E. The session information may be used to uniquely identify the requester of a segment.

The system 100 may comprise a computing device 110C. The computing device 110C may comprise a packaging device, such as a just-in-time packager. The computing device 110C may be in communication with each device shown in the system 100. As further discussed herein, the computing device 110C may receive a manifest 160 for a particular content item (or portion thereof) from the intelligent cache 110B. The computing device 110C may receive requests for segments (e.g., portions) of the content item from the computing device 110E according to the manifest 160. The computing device 110C may retrieve corresponding transcoded segments of the content from the computing device 110A (e.g., via the storage medium 132), prepare/package the transcoded segments for output by the computing device 110E, and deliver the requested segments to the computing device 110E.

Figure 2A:
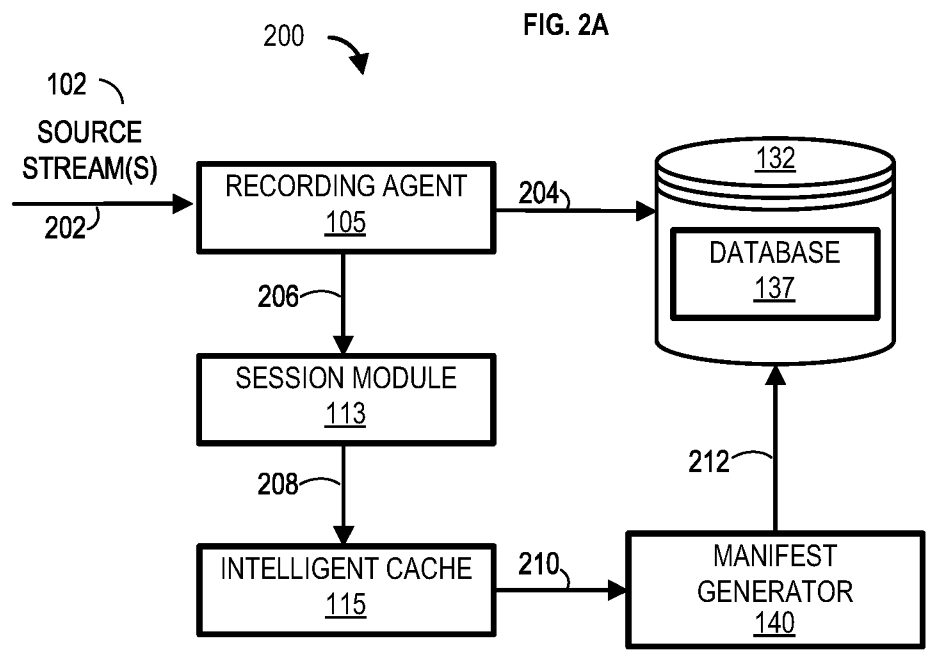
FIG. 2A shows an example view of an example system.

FIG. 2A shows an example view 200 of the system 100 that highlights certain components/modules of the system 100 that are used during a recording process. Interactions between the devices/entities shown in FIG. 2A during the playback process are shown as steps 202-212. As discussed herein, the computing device 110E may record one or more content items for subsequent or concurrent output/playback. When computational resources are stretched too thin at a content delivery network, such as the system 100, cascading effects may negatively impact user experience (e.g., downgrading a requested bitrate, network lag, etc.). Computational resources may be saved by generating/updating manifests (or portions thereof) for recorded content items as new portions are received and processed.

At step 202, the recording agent 105 may receive new portions of a content item via the source stream 102. For example, the recording agent 105 may receive the new portions of the content item as they are encoded/processed. At step 204, the recording agent 105 may store the new portions of the content item as well as associated metadata that identifies the new portions of the content item. The recording agent 105 may store the new portions of the content item and the metadata in the database 137. The metadata may comprise—or be based on—the segment templates 133 and/or the underlying audio/video data 134 for each of the new portions of the content item.

At step 206, the recording agent 105 may send a message to the session module 113. For example, the recording agent 105 may send a message to the session module 113 when new portions of the content item are received and stored. The session module 113 may track computing devices that are recording the content item using the session index. The session index may identify which of the computing devices are concurrently recording and outputting the content items (e.g., hot-recording the content item). The session index may, or may not, identify computing devices that are recording but not simultaneously outputting the corresponding content items (e.g., cold-recording the content items). FIG. 3 shows an example data table 300 for the session index. The session index may comprise a user/device identifier 302, a recording session identifier 304, a request history 306 associated with one or more devices, profiles, users, etc., and/or the like.

The session module 113 may determine, based on the session index, that one or more of the recording sessions has expired. For example, the session module 113 may determine that the first recording session shown in the data table 300 has expired based on the request history 306 indicating a period of inactivity associated with the first recording session (e.g., the computing device has ceased recording and/or consuming the content item). When the session module 113 determines that one or more of the recording sessions has expired, the session module 113 may cause the one or more recording sessions to be removed from the session index.

The message sent by the recording agent 105 at step 206 may be indicative of at least one recording session, such as any of the recording sessions shown in the data table 300. For example, the computing device 110E may be associated with a recording session, and the message sent by the recording agent 105 at step 206 may comprise a user/device identifier 302 and/or a recording session identifier 304 associated with the computing device 110E. The session index may be used to ensure that a portion(s) of a manifest for the content item associated with any new/next portion of the content item is generated and stored prior to the computing device 110E (or any device associated with a recording session) sending a request for any such new/next portion. As further discussed below, the session index may ensure that corresponding portions of the manifest are pre-generated before they are requested (e.g., preventing a "cache miss" from occurring).

At step 208, the session module 113 may send a message to the intelligent cache 115 (e.g., a caching device, storage device, and/or a system of caching/storage devices). The session module 113 may send the message to the intelligent cache 115 at step 208 when new portions of the content item are received and stored by the recording agent 105. For example, as discussed above, the recording agent 105 may send a message to the session module 113 at step 206 when the new portions of the content item are received and stored. The session module 113 may send the message to the intelligent cache 115 at step 208 in response to receiving the message from the recording agent 105 at step 206. The session module 113 may cause a portion of the manifest associated with the new portions of the content item to be generated and stored/cached. For example, the message sent by the session module 113 to the intelligent cache 115 at step 208 may comprise a refresh instruction. The intelligent cache 115, in response to receiving the message (e.g., the refresh instruction) from the session module 113, may fetch (e.g., retrieve, request, etc.) an updated manifest (or portion thereof) for the content item at step 210. The updated manifest may comprise the portion of the manifest associated with the new portions of the content item. The intelligent cache 115 may request the updated manifest from the manifest generator 140. For example, the intelligent cache 115 may send a manifest refresh request to the manifest generator 140 at step 210. The manifest refresh request may be associated the content item and/or the recording session/computing device 110E.

The intelligent cache 115 may request the updated manifest even if a cached version of the manifest is stored at the intelligent cache 115 (e.g., a forced refresh of the manifest may be performed). For example, the intelligent cache 115 may request the updated manifest even if a cached version of the manifest is stored at the intelligent cache 115 in order to ensure that a most up-to-date version of the manifest (or a portion(s) thereof corresponding to the new portions of the content item) is cached at the intelligent cache 115 before it is requested by a user/client device. This "manifest refresh" of the intelligent cache 115, which ultimately is performed in response to receiving the message from the session module 113, may prevent a cache miss(es) from occurring. For example, a cache miss may occur when a user/client device requests a manifest (or a portion thereof) that is not already cached at the intelligent cache 115 (e.g., requiring the intelligent cache 115 to retrieve the requested manifest, or portion, from another device/location). Performing the manifest refresh and subsequently caching the updated manifest may result in a "cache hit(s)" when a user/client device(s) requests the updated manifest, because the manifest refresh ensures that the updated manifest is already cached at the intelligent cache 115 before the user/client device(s) requests the updated manifest/corresponding portion(s) of the content item.

The manifest generator 140 may generate and/or update the manifest based on (e.g., in response to) the manifest refresh request. For example, the manifest generator 140 may send a query to the database 137 at step 212 to retrieve the metadata associated with the new portions of the content item that the recording agent 105 previously stored. The manifest generator 140 may use the metadata associated with the new portions of the content item to determine an update to the manifest. The update to the manifest may comprise determining (e.g., generating, modifying, appending, etc.) a portion of the manifest associated with the new portions of the content item to an existing manifest associated with the content item. The manifest generator 140 may perform an update to each manifest for the content item associated with each device that is concurrently recording and outputting the content item (e.g., based on the session index).

Figure 2B:
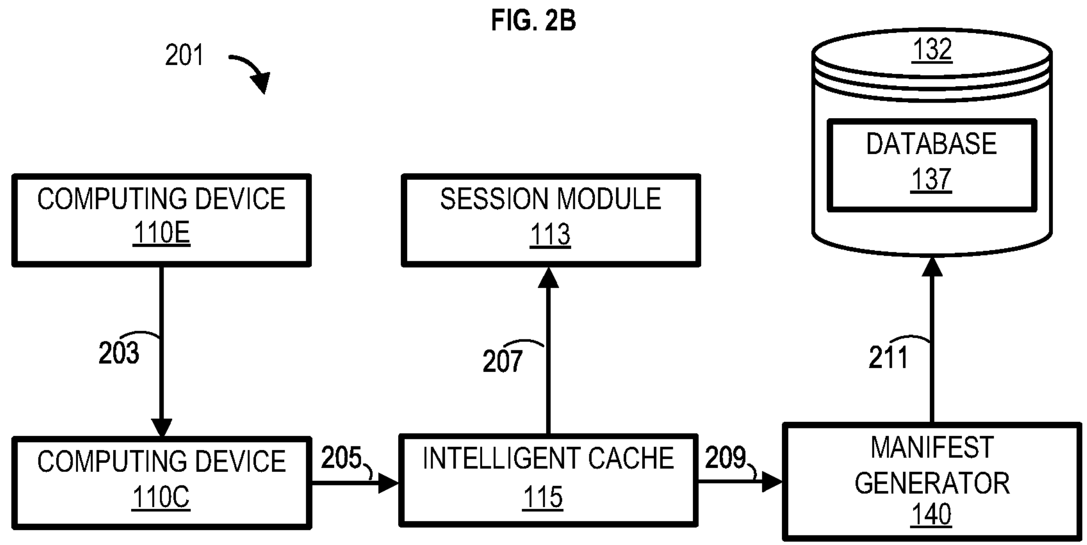
FIG. 2B shows an example view of an example system.

FIG. 2B shows an example view 201 of the system 100 that highlights certain components/modules of the system 100 that are used during a playback process. Interactions between the devices/entities shown in FIG. 2B during the playback process are shown as steps 203-211. As discussed herein, the computing device 110C may record one or more content items and/or output the one or more content items (e.g., concurrently while recording). At step 203, the computing device 110E may send a request for a next portion of the content item (e.g., the new portion(s) of the content item discussed above). The computing device 110E may send the request to the computing device 110C (e.g., the packaging device). The request may be indicative of a portion of the manifest for the content item associated with the next portion of the content item. The request may be associated with a recording session and the computing device 110E. At step 205, the computing device 110C may forward the request to the intelligent cache 115. The intelligent cache 115 may receive the request and may in turn, at step 207, send a message indicative of the request to the session module 113. The session module 113 may update (e.g., generate, append, modify, etc.) the session index to indicate the computing device 110E is concurrently recording and outputting the content item (e.g., if the session index does not already indicate as much).

The intelligent cache 115 may determine whether the portion of the manifest associated with the next portion of the content item is already stored/cached. In scenarios in which the intelligent cache 115 determines that the portion of the manifest associated with the next portion of the content item is not already stored/cached/available (e.g., a "cache miss"), the intelligent cache 115 may request, at step 209, the portion of the manifest from the manifest generator 140. The intelligent cache 115 may request the portion of the manifest from the manifest generator 140 at step 209 to prevent further cache misses. For example, as discussed above regarding step 207, the session module 113 may update (e.g., generate, append, modify, etc.) the session index to indicate the computing device 110E is concurrently recording and outputting the content item. The session module 113, based on the updated session index, may cause the intelligent cache 115 to perform a manifest refresh, as discussed above, when new portions of the content item are received and stored by the recording agent 105. The manifest refresh may ensure that additional cache misses do not occur, because the manifest refresh may ensure that the portion of the manifest associated with the next portion of the content item is generated and stored/cached before another computing device requests that portion of the manifest.

The manifest generator 140 may send a query to the database 137 at step 211 to retrieve the metadata associated with the next portion of the content item that the recording agent 105 previously stored. The manifest generator 140 may use the metadata associated with the next portion of the content item to determine an update to the manifest. The update to the manifest may comprise determining (e.g., generating, modifying, appending, etc.) a portion of the manifest associated with the next portion of the content item to an existing manifest associated with the content item. Upon retrieving the portion of the manifest associated with the next portion of the content item (e.g., from cache or from the manifest generator), the intelligent cache 115 may send that portion of the manifest to the computing device 110C.

The computing device 110C may send the portion of the manifest to the computing device 110E. The portion of the manifest may comprise the determined (e.g., generated, modified, appended, etc.) manifest discussed above. For example, the portion of the manifest received by the computing device 110E may comprise an identifier (e.g., a URL from the list of URLs 162) for the next portion of the content item (e.g., the new portion(s) of the content item) and an identifier for at least one previous portion of the content item. The portion of the manifest received by the computing device 110E may, therefore, be dynamic in nature, since it may "grow" as the computing device 110E records the content item during the corresponding recording session. The computing device 110E may generate a request for the next portion of the content item using the portion of the manifest. For example, the computing device 110E may send a request using a URL identifying the next portion of the content item. The computing device 110E may receive and subsequently output the next portion of the content item during the corresponding recording session. The system 100 may therefore enable the computing device 110E to concurrently record and output the content item.

Figure 4:
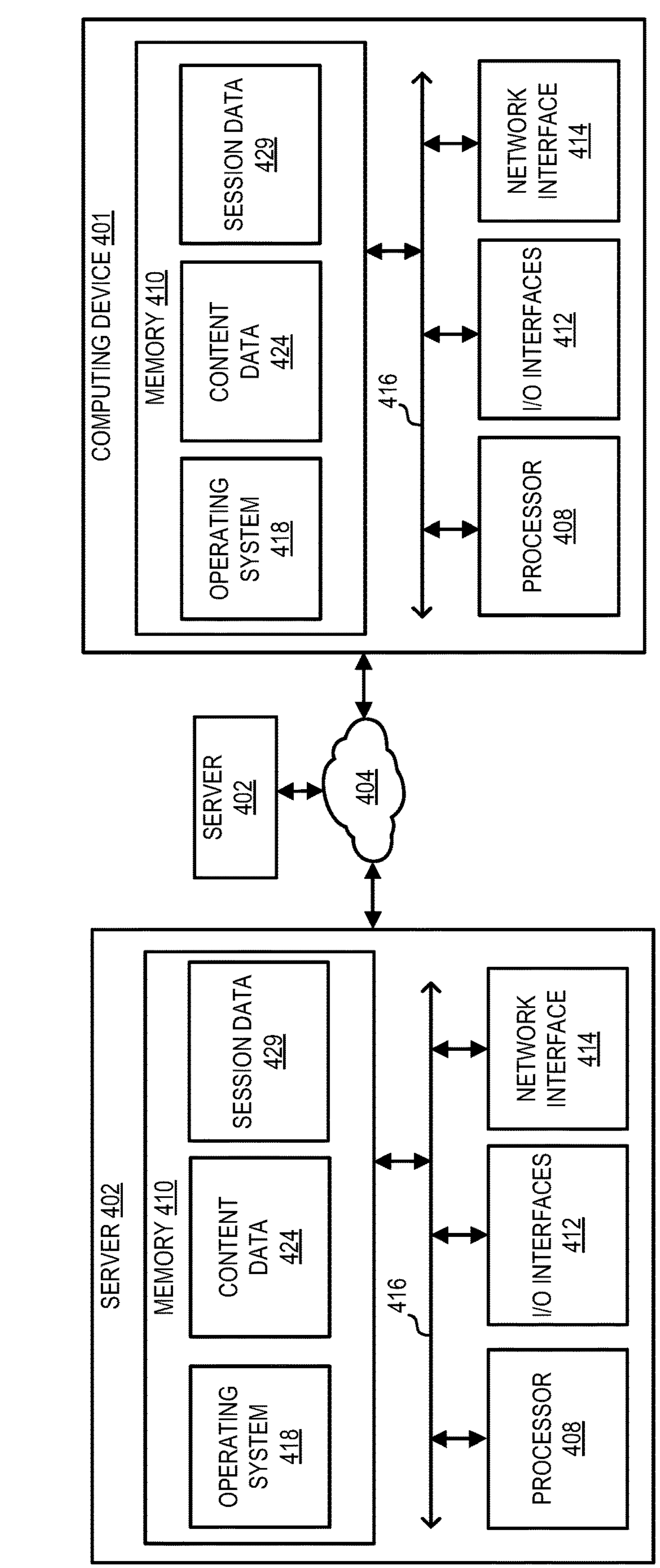
FIG. 4 shows an example system.

The present methods and systems may be computer-implemented. FIG. 4 shows a block diagram depicting a system/environment 400 comprising non-limiting examples of a computing device 401 and a server 402 connected through a network 404. Either of the computing device 401 or the server 402 may be a computing device, such as any of the computing devices 110A, 110B, and 110C as well as the computing device 110D or the computing device 110E of the system 100 shown in FIG. 1. In an aspect, some or all steps of any described method may be performed on a computing device as described herein. The computing device 401 may comprise one or multiple computers configured to store one or more of session data 429 (e.g., a session index), and/or the like. The server 402 may comprise one or multiple computers configured to store content data 424 (e.g., portions of a content item and related metadata). Multiple servers 402 may communicate with the computing device 401 via the network 404.

The computing device 401 and the server 402 may be a digital computer that, in terms of hardware architecture, generally includes a processor 408, system memory 410, input/output (I/O) interfaces 412, and network interfaces 414. These components (408, 410, 412, and 414) are communicatively coupled via a local interface 416. The local interface 416 may be, for example, but not limited to, one or more buses or other wired or wireless connections, as is known in the art. The local interface 416 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 408 may be a hardware device for executing software, particularly that stored in system memory 410. The processor 408 may be any custom made or commercially available processor, a central processing unit (CPU), an auxiliary processor among several processors associated with the computing device 401 and the server 402, a semiconductor-based microprocessor (in the form of a microchip or chip set), or generally any device for executing software instructions. During operation of the computing device 401 and/or the server 402, the processor 408 may execute software stored within the system memory 410, to communicate data to and from the system memory 410, and to generally control operations of the computing device 401 and the server 402 pursuant to the software.

The I/O interfaces 412 may be used to receive user input from, and/or for sending system output to, one or more devices or components. User input may be received via, for example, a keyboard and/or a mouse. System output may be output via a display device and a printer (not shown). I/O interfaces 412 may include, for example, a serial port, a parallel port, a Small Computer System Interface (SCSI), an infrared (IR) interface, a radio frequency (RF) interface, and/or a universal serial bus (USB) interface.

The network interface 414 may be used to transmit and receive from the computing device 401 and/or the server 402 on the network 404. The network interface 414 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 414 may include address, control, and/or data connections to enable appropriate communications on the network 404.

The system memory 410 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 410 may incorporate electronic, magnetic, optical, and/or other types of storage media. Note that the system memory 410 may have a distributed architecture, where various components are situated remote from one another, but may be accessed by the processor 408.

The software in system memory 410 may include one or more software programs, each of which comprises an ordered listing of executable instructions for implementing logical functions. In the example of FIG. 4, the software in the system memory 410 of the computing device 401 may comprise the session data 429, the content data 424, and a suitable operating system (O/S) 418. In the example of FIG. 4, the software in the system memory 410 of the server 402 may comprise the session data 429, the content data 424, and a suitable operating system (O/S) 418. The operating system 418 essentially controls the execution of other computer programs and enables scheduling, input-output control, file and data management, memory management, and communication control and related services.

For purposes of illustration, application programs and other executable program components such as the operating system 418 are shown herein as discrete blocks, although it is recognized that such programs and components may reside at various times in different storage components of the computing device 401 and/or the server 402. An implementation of the system/environment 400 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 5:
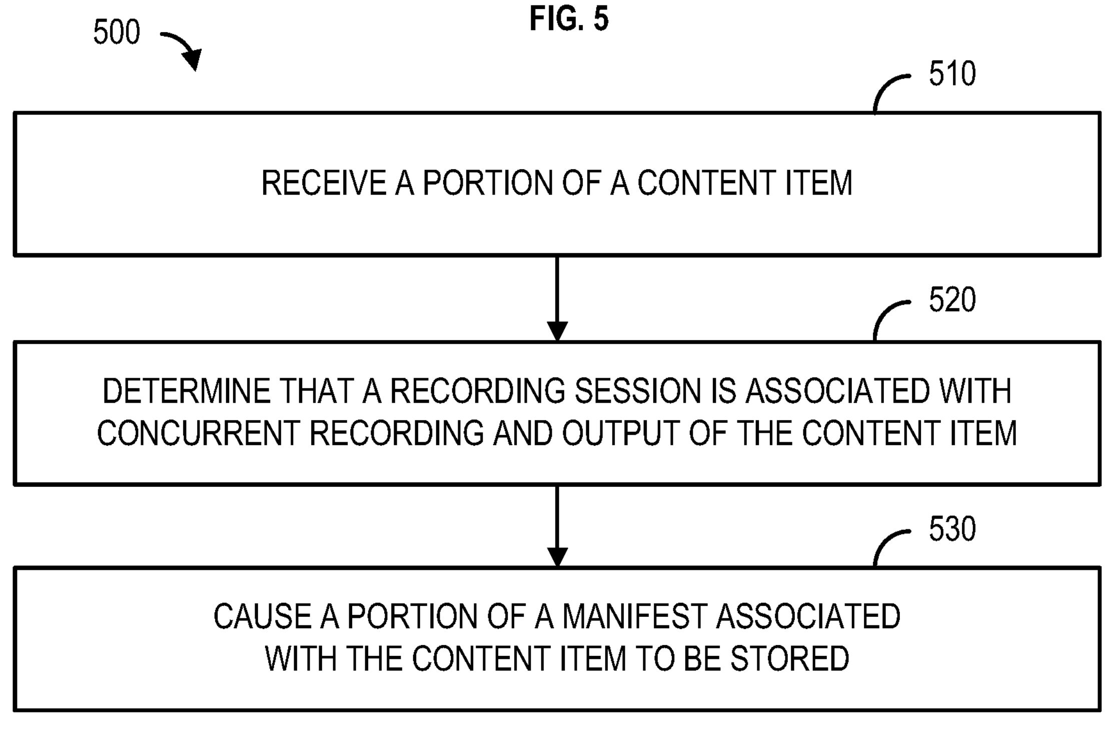
FIG. 5 shows a flowchart for an example method.

FIG. 5 shows a flowchart of an example method 500 for improved content recording and playback. The method 500 may be performed in whole or in part by a single computing device, a plurality of computing devices, and the like. For example, some or all steps of the method 500 may be performed by at least one of: the computing device 110A, the computing device 110B, the computing device 110C, or the computing device 110E shown in FIG. 1. For ease of explanation, the steps of the method 500 are described herein as being performed by a single computing device. However, it is to be understood that some steps of the method 500 may be performed by a first computing device, while other steps of the method 500 may be performed by another computing device(s).

At step 510, a computing device may receive a portion of a content item. The content item may be associated with a recording session and a user device (e.g., the computing device 110E). For example, a recording agent of the computing device (e.g., the recording agent 105) may receive the portion of the content item as it is encoded/processed. The recording agent may store the portion of the content item as well as associated metadata that identifies the portion of the content item. The recording agent may store the portion of the content item and the metadata in a database (e.g., the database 137). The metadata may comprise—or be based on—segment templates and/or underlying audio/video data for each of the new portions of the content item.

At step 520, the computing device may determine that the recording session is associated with concurrent output of the content item by the user device. For example, the computing device may determine that the recording session is associated with concurrent output of the content item by the user device based on a session index. The session index may comprise at least one of: a recording session identifier, a user device identifier, or a request history associated with one or more devices, profiles, users, the recording session, etc. The session index may be maintained (e.g., generated, stored, modified) by a session module (e.g., the session module 113). The session module may track computing devices/user devices that are recording the content item using the session index. The session index may identify which of the computing devices are concurrently recording and outputting the content items (e.g., hot-recording the content item). The session index may, or may not, identify computing devices that are recording but not simultaneously outputting the corresponding content items (e.g., cold-recording the content items). The session module may determine, based on the session index, that one or more of the recording sessions has expired. For example, the session module may determine that a first recording session has expired based on the corresponding request history indicating a period of inactivity associated with the first recording session (e.g., the computing device has ceased recording and/or consuming the content item). When the session module determines that one or more of the recording sessions has expired, the session module may cause the one or more recording sessions to be removed from the session index.

At step 530, the computing device may cause a portion of a manifest associated with the portion of the content item to be stored. For example, the computing device may cause the portion of the manifest associated with the portion of the content item to be stored based on the recording session being associated with concurrent output of the content item by the user device. The session module may send a message to a caching device (e.g., the intelligent cache 115) when the portion of the content item is received and stored by the recording agent. The session module may cause the portion of the manifest associated with the portion of the content item to be stored. For example, the message sent by the session module to the caching device may comprise a refresh instruction. The caching device, in response to receiving the message (e.g., refresh instruction) from the session module, may fetch (e.g., retrieve, request, etc.) an updated manifest (or portion thereof) for the content item. The updated manifest may comprise the portion of the manifest associated with the portion of the content item. The caching device may request the updated manifest from a manifest generator (e.g., the manifest generator 140). For example, the caching device may send a manifest refresh request to the manifest generator. The manifest refresh request may be associated with the content item and/or the recording session/user device. The caching device may request the updated manifest even if a cached version of the manifest is stored at the caching device (e.g., a forced refresh of the manifest may be performed).

For example, the caching device may request the updated manifest even if a cached version of the manifest is stored at the caching device in order to ensure that a most up-to-date version of the manifest (or a portion(s) thereof corresponding to a new portion(s) of the content item) is cached at the caching device before it is requested by the user device. This “manifest refresh” of the caching device, which ultimately is performed in response to receiving the message from the session module, may prevent a cache miss(es) from occurring. For example, a cache miss may occur when the user device requests a manifest (or a portion thereof) that is not already cached at the caching device (e.g., requiring the caching device to retrieve the requested manifest, or portion, from another device/location). Performing the manifest refresh and subsequently caching the updated manifest may result in a “cache hit(s)” when the user device (or another device) requests the updated manifest, because the manifest refresh ensures that the updated manifest is already cached at the caching device before the user device (or another device) requests the updated manifest/corresponding portion(s) of the content item.

The manifest generator may receive a message from the caching device as part of the “forced refresh” described herein. The manifest generator may generate and/or update the manifest based on (e.g., in response to) the manifest refresh request. For example, the manifest generator may send a query to the database to retrieve the metadata associated with the portion of the content item that the recording agent previously stored. The manifest generator may use the metadata associated with the portion of the content item to determine an update to the manifest. The update to the manifest may comprise determining (e.g., generating, modifying, appending, etc.) a portion of the manifest associated with the portion of the content item to an existing manifest associated with the content item.

The caching device may receive a request for the portion of the content item from the user device. The caching device may send the portion of the manifest associated with the portion of the content item to the user device. For example, the caching device may send the determined (e.g., generated, modified, appended, etc.) manifest to the user device. The determined manifest may comprise an identifier (e.g., a URL from the list of URLs 162) for the portion of the content item and an identifier for at least one previous portion of the content item. The user device may request the portion of the content item using the determined manifest. The user device may therefore concurrently record and output the portion of the content item.

Figure 6:
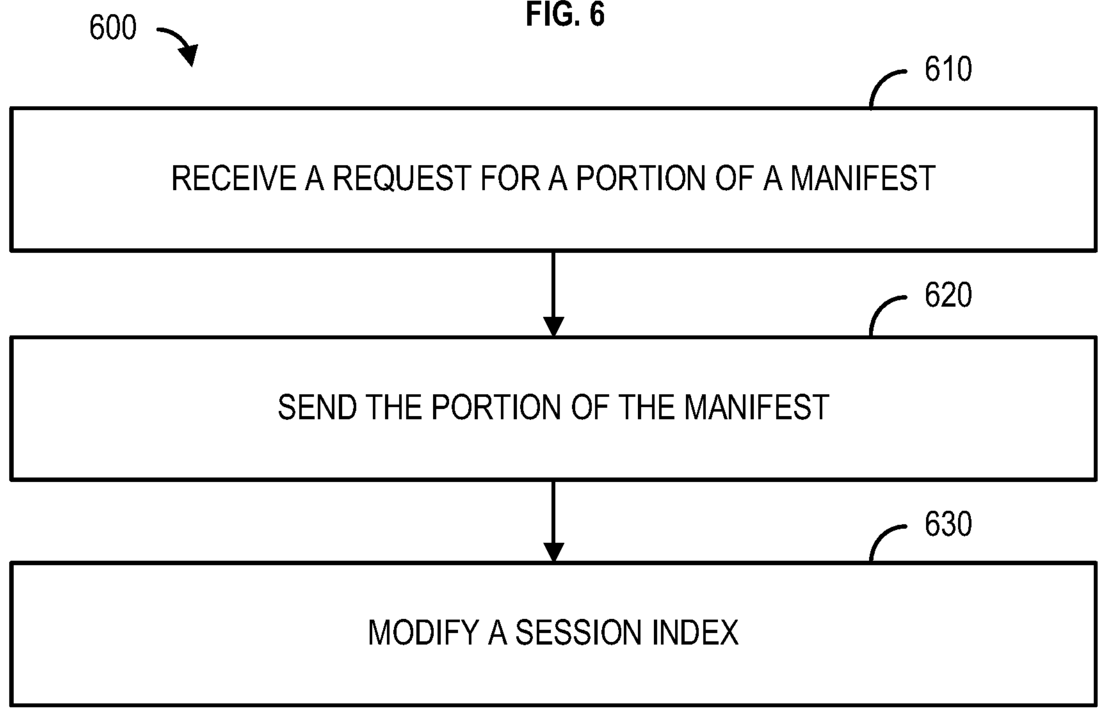
FIG. 6 shows a flowchart for an example method.

FIG. 6 shows a flowchart of an example method 600 for improved content recording and playback. The method 600 may be performed in whole or in part by a single computing device, a plurality of computing devices, and the like. For example, some or all steps of the method 600 may be performed by at least one of: the computing device 110A, the computing device 110B, the computing device 110C, or the computing device 110E shown in FIG. 1. For ease of explanation, the steps of the method 600 are described herein as being performed by a single computing device. However, it is to be understood that some steps of the method 600 may be performed by a first computing device, while other steps of the method 600 may be performed by another computing device(s).

At step 610, a computing device may receive a request for a portion of a manifest associated with a content item. The computing device may receive the request from a user device (e.g., the computing device 110E). The request may be associated with a recording session associated with concurrent output of the content item by the user device. At step 620, the computing device may send the portion of the manifest. For example, the computing device may send the portion of the manifest to the user device. The portion of the manifest may allow the user device to output the portion of the content item during the recording session. For example, the user device may generate a request for the portion of the content item using the portion of the manifest. The user device may send a request using a URL identifying the portion of the content item. The user device may receive and subsequently output the portion of the content item during the recording session.

At step 630, the computing device may modify a session index to identify the recording session. The computing device may modify (e.g., generate, append, update, etc.) the session index to identify the recording session when the computing device determines that the portion of the manifest is unavailable at the caching device. The session index—once modified at step 630—may indicate that the user device is concurrently recording and outputting the content item (e.g., hot-recording the content item). For example, the session index—once modified at step 630—may indicate that the recording session is associated with concurrent output of the content item by the user device. The session index may comprise at least one of: a recording session identifier, a user device identifier, or a request history associated with one or more devices, profiles, users, the recording session, etc. The session index may be maintained (e.g., generated, stored, modified) by a session module (e.g., the session module 113) of the computing device. The session module of the computing device may track computing devices/user devices that are recording the content item using the session index. The session index may identify which of the user devices are concurrently recording and outputting the content items (e.g., hot-recording the content item). The session index may, or may not, identify user devices that are recording but not simultaneously outputting the corresponding content items (e.g., cold-recording the content items). The session module may determine, based on the session index, that one or more of the recording sessions has expired. For example, the session module may determine that a first recording session has expired based on the corresponding request history indicating a period of inactivity associated with the first recording session (e.g., the computing device has ceased recording and/or consuming the content item). When the session module determines that one or more of the recording sessions has expired, the session module may cause the one or more recording sessions to be removed from the session index.

The modified session index (e.g., as a result of step 630) may cause a caching device (e.g., the intelligent cache 115) to store at least one further portion of the manifest associated with at least one further portion of the content item (e.g., a new portion). For example, when the computing device determines that the portion of the manifest is unavailable at the caching device, the computing device may request/receive the at least one further portion of the manifest from a manifest generator (e.g., the manifest generator 140). The session module of the computing device may send a message to the caching device. The message may comprise a refresh instruction. The caching device, in response to receiving the message (e.g., the refresh instruction) from the session module, may fetch (e.g., retrieve, request, etc.) an updated manifest (or portion thereof) for the content item. The updated manifest may comprise the at least one further portion of the manifest associated with at least one further portion of the content item. The caching device may request the updated manifest from the manifest generator. For example, the caching device may send a manifest refresh request to the manifest generator. The manifest refresh request may be associated with the content item and/or the recording session/user device. The caching device may request the updated manifest even if a cached version of the manifest is stored at the caching device (e.g., a forced refresh of the manifest may be performed).

The refresh instruction may prevent a cache miss(es) relating to the at least one further portion of the manifest from occurring. For example, a cache miss may occur when a user/client device requests the at least one further portion of the manifest when it is not already cached at the caching device (e.g., requiring the caching device to retrieve the requested manifest, or portion, from another device/location). The refresh instruction may prevent the cache miss(es) from occurring, because the session module of the computing device, based on the modified session index identifying the recording session, may send the refresh instruction to the caching device. The refresh instruction may cause the caching device to fetch and ultimately store the updated manifest, which may comprise the at least one further portion of the manifest associated with at least one further portion of the content item. The refresh instruction may therefore ensure that additional cache misses do not occur, because the refresh instruction may ensure that the at least one further portion of the manifest associated with at least one further portion of the content item is stored/cached before it is requested.

The manifest generator may generate and/or update the manifest based on (e.g., in response to) the manifest refresh request. For example, the manifest generator may send a query to a database to retrieve metadata associated with the at least one further portion of the content item based on receiving (e.g., in response to receiving) the manifest refresh request. The manifest generator may use the metadata associated with the at least one further portion of the content item to determine the updated manifest. The updated manifest may comprise an appended portion of the manifest associated with the at least one further portion of the content item. For example, the updated manifest may comprise a new portion of an existing manifest associated with the content item. The manifest generator may send the updated manifest, which may comprise the at least one further portion of the manifest, to the caching device. The caching device may store the updated manifest (e.g., the at least one further portion of the manifest) during the recording session. The updated manifest may therefore ensure that additional cache misses do not occur, since the updated manifest, which corresponds to the at least one further portion of the content item, may be stored/cached at the caching device before the at least one further portion of the content item is requested.

Figure 7:
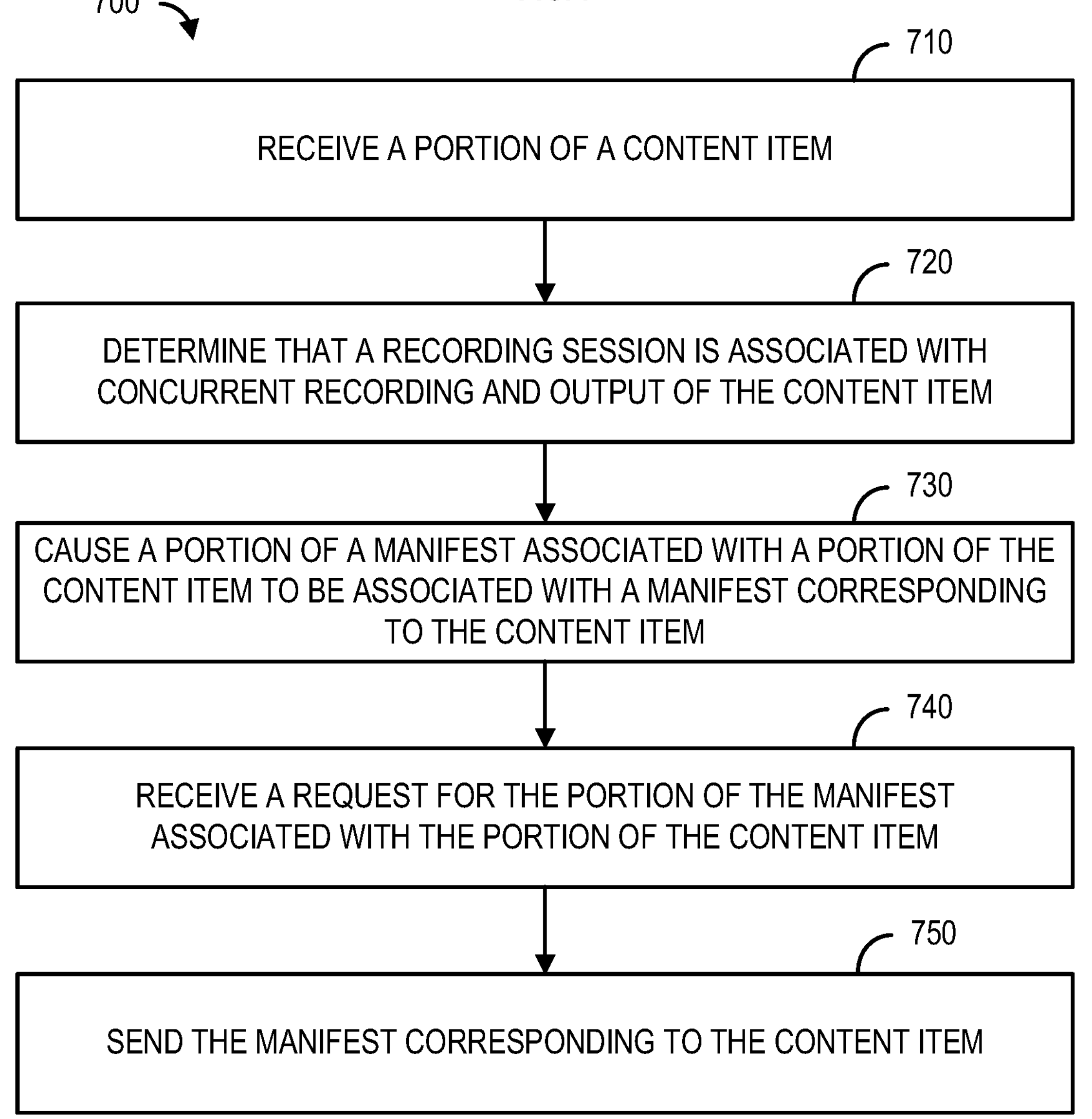
FIG. 7 shows a flowchart for an example method.

FIG. 7 shows a flowchart of an example method 700 for improved content recording and playback. The method 700 may be performed in whole or in part by a single computing device, a plurality of computing devices, and the like. For example, some or all steps of the method 700 may be performed by at least one of: the computing device 110A, the computing device 110B, the computing device 110C, or the computing device 110E shown in FIG. 1. For ease of explanation, the steps of the method 700 are described herein as being performed by a single computing device. However, it is to be understood that some steps of the method 700 may be performed by a first computing device, while other steps of the method 700 may be performed by another computing device(s).

At step 710, a computing device may receive a portion of a content item. The content item may be associated with a recording session and a user device (e.g., the computing device 110E). For example, a recording agent of the computing device (e.g., the recording agent 105) may receive the portion of the content item as it is encoded/processed. The recording agent may store the portion of the content item as well as associated metadata that identifies the portion of the content item. The recording agent may store the portion of the content item and the metadata in a database (e.g., the database 137). The metadata may comprise—or be based on—segment templates and/or underlying audio/video data for each of the new portions of the content item.

At step 720, the computing device may determine that the recording session is associated with concurrent output of the content item by the user device. For example, the computing device may determine that the recording session is associated with concurrent output of the content item by the user device based on a session index. The session index may comprise at least one of: a recording session identifier, a user device identifier, or a request history associated with one or more devices, profiles, users, the recording session, etc. The session index may be maintained (e.g., generated, stored, modified) by a session module (e.g., the session module 113). The session module may track computing devices/user devices that are recording the content item using the session index. The session index may identify which of the user devices are concurrently recording and outputting the content items (e.g., hot-recording the content item). The session index may, or may not, identify user devices that are recording but not simultaneously outputting the corresponding content items (e.g., cold-recording the content items). The session module may determine, based on the session index, that one or more of the recording sessions has expired. For example, the session module may determine that a first recording session has expired based on the corresponding request history indicating a period of inactivity associated with the first recording session (e.g., the computing device has ceased recording and/or consuming the content item). When the session module determines that one or more of the recording sessions has expired, the session module may cause the one or more recording sessions to be removed from the session index.

At step 730, the computing device may cause a portion of a manifest associated with (e.g., corresponding to) the portion of the content item to be associated with a manifest corresponding to the content item. For example, the computing device may cause the portion of the manifest associated with the portion of the content item to be stored based on the recording session being associated with concurrent output of the content item by the user device. The session module may send a message to a caching device (e.g., the intelligent cache 115) when the portion of the content item is received and stored by the recording agent. The session module may cause the portion of the manifest associated with the portion of the content item to be stored. For example, the message sent by the session module to the caching device may comprise a refresh instruction. The caching device, in response to receiving the message (e.g., refresh instruction) from the session module, may fetch (e.g., retrieve, request, etc.) an updated manifest (or portion thereof) for the content item. The updated manifest may comprise the portion of the manifest associated with the portion of the content item. The caching device may request the updated manifest from a manifest generator (e.g., the manifest generator 140). For example, the caching device may send a manifest refresh request to the manifest generator. The manifest refresh request may be associated with the content item and/or the recording session/user device. The caching device may request the updated manifest even if a cached version of the manifest is stored at the caching device (e.g., a forced refresh of the manifest may be performed).

The manifest generator may generate and/or update the manifest based on (e.g., in response to) the manifest refresh request. For example, the manifest generator may send a query to the database to retrieve the metadata associated with the portion of the content item that the recording agent previously stored. The manifest generator may use the metadata associated with the portion of the content item to determine an update to the manifest. The update to the manifest may comprise associating a portion of the manifest associated with the portion of the content item to an existing manifest associated with the content item.

At step 740, the computing device may receive a request for the portion of the manifest associated with the portion of the content item and/or the content item itself from the user device. For example, the caching device may receive a request for the portion of the manifest associated with the portion of the content item. At step 750, the computing device may send the manifest associated with the content item to the user device. The manifest associated with the content item may comprise an identifier (e.g., a URL from the list of URLs 162) for the portion of the content item and an identifier for at least one previous portion of the content item. The user device may request the portion of the content item using the manifest associated with the content item. The user device may therefore concurrently record and output the portion of the content item.

Figure 8:
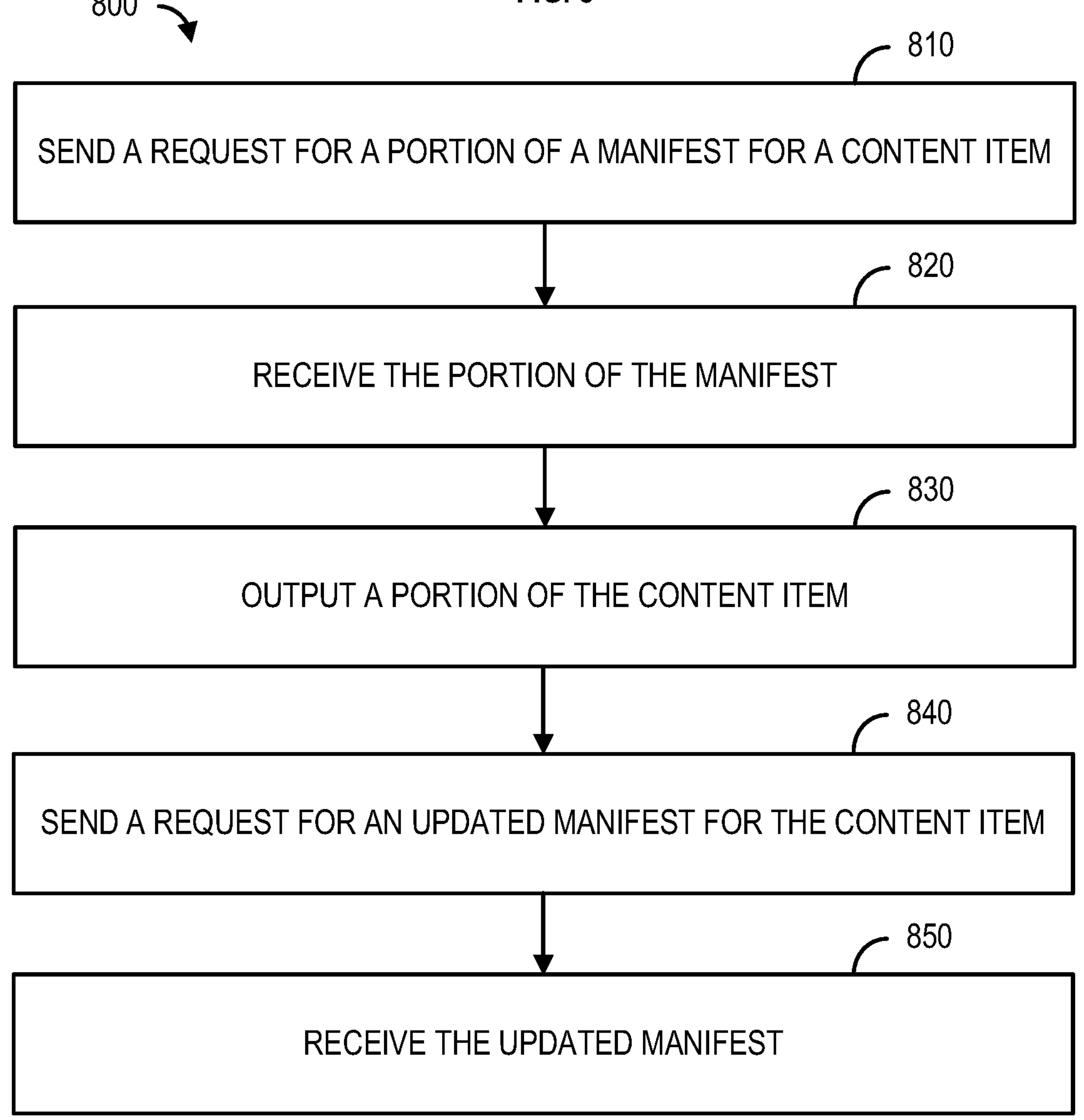
FIG. 8 shows a flowchart for an example method.

FIG. 8 shows a flowchart of an example method 800 for improved content recording and playback. The method 800 may be performed in whole or in part by a single computing device, a plurality of computing devices, and the like. For example, some or all steps of the method 800 may be performed by at least one of: the computing device 110A, the computing device 110B, the computing device 110C, or the computing device 110E shown in FIG. 1. For ease of explanation, the steps of the method 800 are described herein as being performed by a single computing device. However, it is to be understood that some steps of the method 800 may be performed by a first computing device, while other steps of the method 800 may be performed by another computing device(s).

At step 810, a computing device (e.g., the computing device 110E) may send a request for a portion of a manifest associated with a content item. The computing device may send the request to a caching device (e.g., (e.g., the intelligent cache 115, the computing device 110B, etc.). The request may be associated with a recording session associated with concurrent output of the content item by the computing device. At step 820, the computing device may receive the portion of the manifest. For example, the computing device may receive the portion of the manifest from the caching device. The portion of the manifest may allow the computing device to output a portion of the content item during the recording session. For example, the computing device may generate a request for a segment(s) comprising the portion of the content item based on the portion of the manifest. The computing device may send the request using a URL identifying the segment(s) and/or the portion of the content item. The URL may be generated by the computing device using the portion of the manifest. The computing device may receive the segment(s) comprising the portion of the content item during the recording session. At step 830, the computing device may output the portion of the content item (e.g., output the segment(s)). For example, the computing device may output the portion of the content item during the recording session.

The caching device may modify a session index to identify the recording session. The caching device may modify (e.g., generate, append, update, etc.) the session index to identify the recording session and/or the computing device when the caching device determines that the portion of the manifest is unavailable. The modified session index may indicate that the computing device is concurrently recording and outputting the content item (e.g., hot-recording the content item). For example, the modified session index may indicate that the recording session is associated with concurrent output of the content item by the computing device. The session index may comprise at least one of: a recording session identifier, an identifier associated with the computing device, or a request history associated with one or more devices, profiles, users, the recording session, etc.

The session index may be maintained (e.g., generated, stored, modified) by a session module (e.g., the session module 113) of the caching device. The session module of the caching device may track computing devices that are recording the content item using the session index. The session index may identify which of the computing devices/user devices are concurrently recording and outputting the content items (e.g., hot-recording the content item). The session index may, or may not, identify computing devices/user devices that are recording but not simultaneously outputting the corresponding content items (e.g., cold-recording the content items). The session module may determine, based on the session index, that one or more of the recording sessions has expired. For example, the session module may determine that a first recording session has expired based on the corresponding request history indicating a period of inactivity associated with the first recording session (e.g., the computing device has ceased recording and/or consuming the content item). When the session module determines that one or more of the recording sessions has expired, the session module may cause the one or more recording sessions to be removed from the session index.

The modified session index may cause the caching device to store at least one further portion of the manifest associated with at least one further portion of the content item (e.g., a new portion). For example, when the caching device determines that the portion of the manifest is unavailable, the caching device may request/receive the at least one further portion of the manifest from a manifest generator (e.g., the manifest generator 140). The session module of the caching device may send a message that causes an updated manifest (or portion thereof) for the content item to be retrieved, generated, determined, etc. The updated manifest may comprise the at least one further portion of the manifest associated with at least one further portion of the content item. The updated manifest may be sent to the caching device. The caching device may store the updated manifest (e.g., the at least one further portion of the manifest) during the recording session. The updated manifest may therefore ensure that cache misses do not occur, since the updated manifest, which corresponds to the at least one further portion of the content item, may be stored/cached at the caching device before the at least one further portion of the content item is requested by the computing device.

At step 840, the computing device may send a request for the updated manifest (or a portion thereof). The computing device may send the request to the caching device. The request may be associated with the recording session. At step 850, the computing device may receive the updated manifest (or the portion thereof). For example, the computing device may receive the updated manifest (or the portion thereof) from the caching device. The updated manifest (or the portion thereof) may allow the computing device to output the at least one further portion of the content item. For example, similar to above, the computing device may generate a request for a segment(s) comprising the at least one further portion of the content item based on the updated manifest (or the portion thereof). The computing device may receive the segment(s) comprising the at least one further portion of the content item during the recording session. At step 850, the computing device may output the at least one further portion of the content item (e.g., output the segment(s)). For example, the computing device may output the portion of the content item during the recording session.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:

receiving, by a computing device, a second portion of a content item, wherein the content item is associated with a recording session and a user device;

determining that the recording session is associated with concurrent output of a first portion of the content item by the user device; and based on the recording session and based on a request for a portion of a manifest associated with the second portion of the content item, and prior to the user device requesting the second portion of the content item, causing the portion of the manifest associated with the second portion of the content item to be stored in at least one cache, wherein the manifest comprises a list of segment identifiers, wherein the user device receives the portion of the manifest via the at least one cache and causes output of the second portion of the content item during the recording session.

2. The method of claim 1, wherein determining that the recording session is associated with concurrent output of the first portion of the content item by the user device comprises determining, based on a session index, that the recording session is associated with concurrent output of the first portion of the content item by the user device.

3. The method of claim 2, wherein the session index comprises at least one of: a recording session identifier, a user device identifier, or a request history.

4. The method of claim 2, further comprising:

determining, based on the session index, that the recording session has expired; and causing, based on the recording session having expired, the recording session to be removed from the session index.

5. The method of claim 1, wherein causing the portion of the manifest associated with the second portion of the content item to be stored comprises:

sending, to a caching device associated with the at least one cache, a refresh instruction, wherein the refresh instruction causes the caching device to send the request for the manifest associated with the second portion of the content item to a manifest generator.

6. The method of claim 1, wherein causing the portion of the manifest associated with the second portion of the content item to be stored comprises:

causing, by a caching device associated with the at least one cache, the portion of the manifest associated with the second portion of the content item to be appended to a manifest associated with the content item, wherein the appended manifest associated with the content item comprises a segment identifier from the list of segment identifiers for the second portion of the content item and at least one segment identifier from the list of segment identifiers for at least one previous portion of the content item.

7. The method of claim 1, further comprising:

receiving, by a caching device associated with the at least one cache, from the user device, a request for the second portion of the content item, and sending, by the caching device to the user device, the portion of the manifest associated with the second portion of the content item.

8. A method comprising:

receiving, by a computing device from a user device, a request for a portion of a manifest associated with a second portion of a content item, wherein the request is associated with a recording session associated with concurrent output of a first portion of the content item by the user device, wherein the manifest comprises a list of segment identifiers;

sending, to the user device, the portion of the manifest, wherein the portion of the manifest causes the user device to output the second portion of the content item during the recording session; and based on the recording session, modifying a session index to identify the recording session and to indicate that the recording session is associated with concurrent output of the content item by the user device, wherein, in response to a request for at least one further portion of the manifest associated with at least one further portion of the content item, the session index causes a caching device to store the at least one further portion of the manifest associated with the at least one further portion of the content item prior to the user device requesting the at least one further portion of the content item, wherein the user device requests, via the caching device, and outputs the at least one further portion of the content item during the recording session.

9. The method of claim 8, wherein the session index comprises at least one of: a recording session identifier associated with the recording session, an identifier associated with the user device, or a request history associated with the user device.

10. The method of claim 8, wherein modifying the session index to identify the recording session comprises: determining that the portion of the manifest is unavailable at the caching device.

11. The method of claim 8, further comprising retrieving, based on the portion of the manifest being unavailable at the caching device, the portion of the manifest from a manifest generator.

12. The method of claim 8, further comprising:

receiving the at least one further portion of the content item;

determining, based on the session index, that the recording session is associated with concurrent output of the content item by the user device; and sending, to the caching device, a refresh instruction, wherein the refresh instruction causes the caching device to send the request for the manifest associated with the at least one further portion of the content item to a manifest generator.

13. The method of claim 12, further comprising:

determining, by the manifest generator, based on the request for the manifest, the at least one further portion of the manifest; and sending, to the caching device, the at least one further portion of the manifest.

14. The method of claim 8, further comprising storing, by the caching device, during the recording session, the at least one further portion of the manifest.

15. A method comprising:

receiving a second portion of a content item, wherein the content item is associated with a recording session and a user device;

determining, based on a session index, that the recording session is associated with concurrent output of a first portion of the content item at the user device;

based on the recording session and based on a request for a portion of a manifest associated with the second portion of the content item, causing the portion of the manifest corresponding to the second portion of the content item to be stored at at least one cache prior to the user device requesting the second portion of the content item or the portion of the manifest, wherein the manifest comprises a list of segment identifiers, wherein the manifest corresponding to the content item comprises a segment identifier from the list of segment identifiers for the second portion of the content item and at least one segment identifier from the list of segment identifiers for at least one previous portion of the content item;

receiving, from the user device, a request for the portion of the manifest associated with the second portion of the content item; and sending, to the user device, the manifest corresponding to the content item, wherein the manifest corresponding to the content item causes the user device to request, via the at least one cache, and output the second portion of the content item during the recording session.

16. The method of claim 15, wherein the session index comprises at least one of: a recording session identifier, a user device identifier, or a request history.

17. The method of claim 15, further comprising sending, to a caching device, a refresh instruction, wherein the refresh instruction causes the caching device to send the request for the manifest associated with the at least one further portion of the content item to a manifest generator.

18. The method of claim 17, further comprising receiving, from the manifest generator, the portion of the manifest associated with the second portion of the content item.

19. The method of claim 15, further comprising sending, to a caching device, the portion of the manifest associated with the second portion of the content item.

20. The method of claim 19, further comprising appending, by a manifest generator, the portion of the manifest associated with the second portion of the content item to the manifest associated with the content item.

* * * * *